US011323643B2

(12) United States Patent
McElvain et al.

(10) Patent No.: US 11,323,643 B2
(45) Date of Patent: May 3, 2022

(54) CMOS SENSOR ARCHITECTURE FOR TEMPORAL DITHERED SAMPLING

(71) Applicant: Dolby Laboratories Licensing Corporation, San Francisco, CA (US)

(72) Inventors: Jon S. McElvain, Manhattan Beach, CA (US); Gregory John Ward, Berkeley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/275,984

(22) PCT Filed: Sep. 10, 2019

(86) PCT No.: PCT/US2019/050466
§ 371 (c)(1),
(2) Date: Mar. 12, 2021

(87) PCT Pub. No.: WO2020/055907
PCT Pub. Date: Mar. 19, 2020

(65) Prior Publication Data
US 2022/0046195 A1 Feb. 10, 2022

Related U.S. Application Data

(60) Provisional application No. 62/730,235, filed on Sep. 12, 2018.

(30) Foreign Application Priority Data

Sep. 12, 2018 (EP) .................................... 18193941

(51) Int. Cl.
*H04N 5/355* (2011.01)
*H04N 5/374* (2011.01)
(Continued)

(52) U.S. Cl.
CPC ..... *H04N 5/35581* (2013.01); *H04N 5/37457* (2013.01); *H04N 9/04551* (2018.08)

(58) Field of Classification Search
CPC ............. H04N 5/3558; H04N 5/37457; H04N 5/37452; H04N 5/379; H04N 5/378;
(Continued)

(56) References Cited

U.S. PATENT DOCUMENTS 7,244,920 B2   7/2007  Kim
7,525,077 B2   4/2009  Kim
(Continued)

FOREIGN PATENT DOCUMENTS

CN   102984464   3/2013
CN   108305884   7/2018
(Continued)

OTHER PUBLICATIONS

Kabir, S. et al "Optimization of CMOS Image Sensor Utilizing Variable Temporal Multisampling Partial Transfer Technique to Achieve Full-Frame High Dynamic Range with Superior Low Light and Stop Motion Capability" Journal of Electronic Imaging, Mar./Apr. 2018, vol. 27(2).
(Continued)

*Primary Examiner* — Marly S Camargo

(57) ABSTRACT

Imaging methods and devices with pixels divided into pixel groups are disclosed. A pixel group-based global shutter and pixel group-wise staggered long and short exposure followed by readout of two samples per pixel are presented. Example methods and devices for a Bayer color filter array divided into groups of n×n pixels are provided.

14 Claims, 11 Drawing Sheets

(51) Int. Cl.
*H04N 5/378* (2011.01)
*H04N 9/04* (2006.01)
*H04N 5/353* (2011.01)
*G06T 3/40* (2006.01)
*H04N 5/3745* (2011.01)

(58) Field of Classification Search
CPC ............ H04N 5/3532; H04N 9/04515; H04N 2209/045; H04N 9/04551; G06T 3/4015
See application file for complete search history.

(56) References Cited

U.S. PATENT DOCUMENTS

| | | | |
|---|---|---|---|
| 7,781,716 B2 | 8/2010 | Anderson | |
| 7,804,117 B2 | 9/2010 | McKee | |
| 7,825,970 B2 | 11/2010 | Choi | |
| 7,829,969 B2 | 11/2010 | Altice, Jr. | |
| 8,125,553 B2 | 2/2012 | Mori | |
| 8,405,751 B2 | 3/2013 | Hibbeler | |
| 8,847,136 B2 | 9/2014 | Ayers | |
| 8,866,961 B2 * | 10/2014 | Shimada | H04N 5/35581 348/367 |
| 8,953,075 B2 | 2/2015 | Ayers | |
| 9,160,956 B2 | 10/2015 | Lahav | |
| 9,774,801 B2 | 9/2017 | Hseih | |
| 9,793,313 B2 | 10/2017 | Ishiwata | |
| 9,894,304 B1 * | 2/2018 | Smith | H04N 5/374 |
| 9,936,148 B2 | 4/2018 | McMahon | |
| 2013/0033616 A1 | 2/2013 | Kaizu | |
| 2013/0057754 A1 | 3/2013 | Shimada | |
| 2014/0160260 A1 * | 6/2014 | Blanquart | H04N 13/239 348/68 |
| 2017/0366766 A1 | 12/2017 | Geurts | |
| 2018/0227529 A1 | 8/2018 | Mo | |
| 2019/0088178 A1 | 3/2019 | Ward | |
| 2021/0235027 A1 * | 7/2021 | Meynants | H04N 5/353 |

FOREIGN PATENT DOCUMENTS

| | | |
|---|---|---|
| JP | 2017055350 A | 3/2017 |
| WO | 2017146972 A1 | 8/2017 |

OTHER PUBLICATIONS

Kudoh, Y. et al "Shared transistor architecture with diagonally connected pixels for CMOS Image Sensors" SPIE Electronic Imaging, Feb. 21, 2007, pp. 1-9.

Lauxtermann, S. et al "Comparison of Global Shutter Pixels for CMOS Image Sensors" 2007, pp. 82-85.

Xhakoni, A. et al "A 132-dB Dynamic-Range Global-Shutter Stacked Architecture for High-Performance Imagers" IEEE Transactions on Circuits and Systems—vol. 61, No. 6, Jun. 2014, pp. 398-402.

Yasutomi, K. et al "A Two-Stage Charge Transfer Active Pixel CMOS Image Sensor with Low-Noise Global Shuttering and a Dual-Shuttering Mode" IEEE Transactions on Electron Devices, vol. 58, No. 3, Mar. 2011, pp. 740-747.

* cited by examiner

Fig.3A (PRIOR ART)

CMOS SENSOR ARCHITECTURE FOR TEMPORAL DITHERED SAMPLING

CROSS-REFERENCE TO RELATED APPLICATIONS

This application claims the benefit of priority to U.S. Provisional Patent Application No. 62/730,235, filed Sep. 12, 2018, and to European Patent Application No. 18193941.4, filed Sep. 12, 2018, both of which are hereby incorporated by reference in their entirety.

The present application may be related to U.S. provisional patent application 62/617,709, filed on Jan. 16, 2018, entitled "Image Demosaicing System and Method" which is incorporated herein by reference in its entirety.

BACKGROUND

(1) Technical Field

The present disclosure is related to complementary metal-oxide semiconductor (CMOS) image sensors, and more particularly to methods and apparatus for temporal dithered sampling of image pixels.

(2) Background

The use of CMOS image sensors is ubiquitous for most consumer and professional camera systems. The Bayer mosaic pattern, as shown in FIG. 1, is commonly used for imaging red, green and blue (R, G, B) color channels, and a de-mosaicing process is used after capture to estimate the full-resolution R, G, B images. Particularly for consumer applications, a rolling shutter readout is typically used as it allows exposure during readout with a minimal transistor count per pixel and maintains a low power consumption. In this approach, and per scanline, each pixel voltage is transferred simultaneously to a column buffer below the sensor array, and those values are subsequently read out serially using a multiplexer. After the transfer to the column buffer, the photodiode of each pixel in that row is reset to allow a new integration to begin. This process is repeated for subsequent rows, but in the rolling shutter approach the photodiode reset signal for a particular row will be delayed slightly (by the row transfer and readout time) relative to the previous row. This temporal staggering along the vertical direction can result in motion artifacts for scene objects that are moving quickly, the most common being an apparent bending of vertical or horizontal edges.

For higher-end scientific or professional cameras, global shuttering techniques are also used. Most commonly used is the 5 transistor (5T) pixel structure shown in FIG. 2A, whereby an additional reset transistor (RsSN) is connected to the photodiode (PD). Integration while read (IWR) is permitted with this architecture, whereby the sampled signal is transferred to the floating diffusion (FD) region and stored there until readout of the row. The 5T design suffers from poor shutter efficiency (unintended output signal generated when the shutter is off) due to stray capacitive coupling while the charge is being held on the FD before readout.

FIG. 2B shows a 7T pixel architecture that improves global shutter efficiency via the use of an additional pinned storage diode (SD) for intermediate charge storage. With this approach, a dual exposure IWR mechanism that allows for the sequential capture of long and short exposures within the same frame is demonstrated in prior art. Correlated double sampling (CDS) can be used for the long exposure, which is capable of significantly reducing reset noise and fixed pattern (FP) noise from that exposure; double sampling (DS) is applied to the short exposure, which can reduce FP noise but not reset noise. However, isolation of the SD region requires additional doping methods that are not commonly found in CMOS sensor foundries, making this method difficult to scale to mass production FIG. 2C shows a stacked CMOS approach for intra-frame multi shuttering. In such approach, a top layer of silicon (201) contains a 4T pixel array with a backside illuminated photodiode. Using a micro-bump (202) contact at each photo-site, this top layer is connected to a lower level array containing DS/CDS circuits and multi-exposure selection logic. The pixel pitch is 10 μm, the size being primarily determined by the relative complexity of the lower level circuit (203) in each unit cell. Such stacked design, may help achieving an improved photodiode fill factor given that the design is implemented on two separate layers.

As described in the PCT application WO 2017/146972 A1 filed Feb. 16, 2017, published Feb. 16, 2017, entitled "Apparatus and Method for Encoding High Frame Rate Content in Standard Frame Rate Video Using Temporal Interlacing" which is incorporated herein by reference in its entirety, capturing pictures at a high frame-rate is hampered by bandwidth and noise issues. The larger number of pictures captured increases the amount of data per second sent down the pipeline thus affecting bandwidth and the higher frame-rates translate to shorter exposure times and increase the noise associated with the picture. However, high frame-rate video allows a reduction of motion artifacts such as judder and excessive blurring due to motion. The above-incorporated application discloses methods and devices that may provide a higher perceptible frame rate without the associated cost in bandwidth and display technology. In other words, such methods and devices provide a mechanism to achieve high frame rate reconstruction without having to increase the frame data transmission rate.

The methods and devices disclosed in the above-incorporated application show an imaging system comprising a pixel image sensor array disposed on a substrate, said pixel image sensor array comprising a plurality of pixels. The imaging system further comprises a multistage timer coupled to said pixel image sensor array for triggering exposures of said plurality of pixels, wherein the pixels are grouped into N subsets, and the multi-stage timer is configured to trigger, for each of the N subsets, an exposure sequence of at least two exposures of different capture duration of the pixels of said subset, wherein start times of the exposure sequences of the different subsets are temporally offset by a predetermined offset, and the sequences have the same overall duration T and the predetermined temporal offset Toffset is smaller than said overall duration T. As an example, the two exposures of different capture duration may be a short and a long exposure. FIGS. 3A-3B show another example to illustrate such concept wherein a Bayer mosaic is shown and the pixels are divided into groups of 3×3 pixels and labelled by pixel type 0-8 in each cell. The red, blue and green colors are indicated with letters R, G, B in each pixel. In this example, the capture frame rate is 30 fps (frame per second). For each pixel type, there is a short and long exposure with durations of $\frac{1}{9}^{th}$ and $\frac{8}{9}^{th}$ of frame respectively (i.e. $\frac{1}{270}$ and $\frac{8}{270}$ seconds based on a frame rate of 30 fps). As shown in FIG. 3B, the short and long exposure of each pixel type is staggered by $\frac{1}{9}$ of a frame relative to the previous pixel type. In other words, and continuing with the same example, on the receiver side, a video reconstruction of 270 fps is made possible with a data transmission of 30 fps, by grouping pixels into cells of 3×3=9 pixels and staggering the short and long exposure of subsequent pixel types by a duration of ⅑$^{th}$ of a frame relative to the previous pixel type.

SUMMARY

In view of what described above, highly efficient, scalable CMOS sensor designs offering high fill factors and avoiding motion artifacts as a result of using the rolling shutter approach are needed and highly desired. Methods and devices taught in the present disclosure address such need. Moreover, and as will be described in detail, the disclosed methods and devices also adopt the concept disclosed in the above-incorporated application as illustrated in FIGS. 3A-3B.

According to a first aspect of the disclosure, an image sensor is provided comprising: a plurality of pixel sites divided into groups of N pixel sites, N being an integer larger than one, wherein: pixel sites of the N pixel sites are labeled by pixel types using a sequence of N consecutive numbers; the pixel sites of the N pixel sites are configured to undergo an exposure sequence comprising a first exposure of a first capture duration followed by a second exposure of a second capture duration, thereby generating a first pixel signal corresponding to the first exposure and a second pixel signal corresponding to the second exposure; the image sensor is configured such that the first pixel signal and the second pixel signal are read out subsequent to the second exposure; start times of the exposure sequences of pixel sites of consecutive pixel types are staggered by a set offset time; and the plurality of pixel sites have equal frame times, wherein the frame time of the pixel sites is defined as a sum of the first capture duration, the second capture duration, the readout time, and a blanking time.

According to a second aspect of the disclosure, an electronic circuit comprising a pixel site arrangement and a storage arrangement is provided, wherein: the pixel site arrangement comprises N pixel sites, N being an integer larger than one, and a floating diffusion circuit; a pixel site of the N pixel sites comprises a photodiode, a pixel site reset transistor to reset the photodiode and a pixel site transfer transistor through which pixel signals are transferred to the floating diffusion circuit when the pixel site transfer transistor is activated; the pixel sites of the N pixel sites are labelled by pixel types using a sequence of N consecutive integers; the floating diffusion element comprises: i) a floating diffusion element to store charges from pixel signals generated due to exposures; ii) a floating diffusion reset transistor connected to the floating diffusion element and used to reset the floating diffusion capacitor; and iii) a floating diffusion transfer transistor arranged in a source-follower configuration and connecting the floating diffusion element to the storage arrangement; the floating diffusion element is shared among the N pixel sites; the pixel site transfer transistors of the N pixel sites are activated one at a time to connect one pixel site of the N pixel sites with the floating diffusion element at a time; the pixel site arrangement and the storage arrangement are implemented on separate dies or chips; and the separate dies or chips are connected to each other through micro-bump.

According to a third aspect of the disclosure, a method of imaging is provided, comprising: providing a plurality of pixel sites; dividing the plurality of the pixel sites into groups of N pixel sites, N being an integer larger than one; using a sequence of N consecutive integer to label the pixel sites of the N pixel sites by pixel types; exposing pixel sites of same pixel types to a first exposure of a first capture duration, thereby generating first pixel signals; exposing the pixel sites of the same pixel types to a second exposure of a second capture duration, thereby generating second pixel signals; reading out the first pixel signals and the second pixel signals; and staggering the first exposure, the second exposure, the readout and a blanking time of pixel sites of consecutive pixel types by a set offset time.

According to a fourth aspect of the disclosure, an electronic circuit comprising a pixel site arrangement and a storage arrangement is provided, wherein: the pixel site arrangement comprises N pixel sites, N being an integer larger than one, and a floating diffusion circuit; a pixel site of the N pixel sites comprises a photodiode, a pixel site reset transistor to reset the photodiode and a pixel site transfer transistor through which pixel signals are transferred to the floating diffusion circuit when the pixel site transfer transistor is activated; the pixel sites of the N pixel sites are labelled by pixel types using a sequence of N consecutive integers; the floating diffusion element comprises: i) a floating diffusion element to store charges from pixel signals generated due to exposures; ii) a floating diffusion reset transistor connected to the floating diffusion element and used to reset the floating diffusion capacitor; and iii) a floating diffusion transfer transistor arranged in a source-follower configuration and connecting the floating diffusion element to the storage arrangement; the floating diffusion element is shared among the N pixel sites.

According to a fifth aspect of the disclosure, an electronic circuit comprising a pixel site arrangement and a storage arrangement, wherein: the pixel site arrangement comprises N pixel sites, N being an integer larger than one, and a floating diffusion circuit; a pixel site of the N pixel sites comprises a photodiode, a pixel site reset transistor to reset the photodiode and a pixel site transfer transistor through which pixel signals are transferred to the floating diffusion circuit when the pixel site transfer transistor is activated; the floating diffusion element comprises: i) a floating diffusion capacitor to store charges from pixel signals generated due to exposures; ii) a floating diffusion reset transistor connected to the floating diffusion capacitor and used to reset the floating diffusion capacitor; and iii) a floating diffusion transfer transistor arranged in a source-follower configuration and connecting the floating diffusion capacitor to the storage arrangement; the floating diffusion element is shared among the N pixel sites; the pixel site arrangement and the storage arrangement are implemented on separate dies or chips; the separate dies or chips are connected to each other through microbumps; a pixel site of the N pixel site, wherein N is is configured to undergo an exposure sequence comprising a first exposure of a first capture duration followed by a second exposure of a second capture duration, thereby generating a first pixel signal corresponding to the first exposure followed by a second pixel signal corresponding to the second exposure; the electronic circuit is configured such that the first pixel signal and the second pixel signal are read out subsequent to the second exposure; start times of the exposure sequences of consecutive pixel sites of the N pixel sites are staggered by a set offset time; the pixel sites of the N pixel sites have equal frame times, wherein the overall frame time of the pixel site of the N pixel sites is defined as a sum of the first capture duration, the second capture duration, and the readout time; the first capture duration of all pixel sites of the N pixel sites are equal; the second capture duration of all pixel sites of the N pixel sites are equal; the readout time of all pixel sites of the N pixel sites are equal; the two samples comprises a first sample and a second sample and wherein: the first sample corresponds to charges across the floating diffusion capacitor after the floating diffusion capacitor is reset by activating the floating diffusion reset transistor; and the second sample corresponds to charges generated due to the first exposure of a corresponding pixel site of the N pixel sites.

DESCRIPTION OF THE DRAWINGS

FIG. 3A shows a prior art Bayer mosaic which pixels are divided into cells of 3×3 pixels.

DETAILED DESCRIPTION

Definitions

Throughout the present disclosure, the term "floating diffusion" will be used to refer to a charge sensing circuit used to convert the charge packets carried by the photodiode of a pixel of an image sensor into a voltage change which can be detected at the sensor output. The terms "pixel sample" or "pixel signal" are used to describe signals that are based on such voltage change.

Throughout the present disclosure, the term "correlated double sampling" will be used to describe a method to measure electrical values such as voltages or currents that allows removing an undesired offset. It is used often when measuring sensor outputs. The output of the sensor is measured twice: once in a known condition and once in an unknown condition. The value measured from the known condition is then subtracted from the unknown condition to generate a value with a known relation to the physical quantity being measured. When used in image sensors, correlated double sampling is a noise reduction technique in which the reference voltage of the pixel (i.e., the pixel's voltage after it is reset) is removed from the signal voltage of the pixel (i.e., the pixel's voltage at the end of exposure) at the end of each exposure period.

Throughout the present disclosure, the term "pixel site" will be used to describe an electronic circuit comprising a photodiode and transistors. Such electronic circuit generates charges upon exposure to light and may store or reset such charges and/or transfer such charges to other neighboring circuits such as storage circuits.

Throughout the present disclosure, the term "shutter" will be used to describe a device that allows light to pass for a determined period, exposing a photosensitive digital sensor to light in order to capture a permanent image of a scene.

Throughout the present disclosure, the term "global shutter" will be used to describe a type of shutter (used image sensors) that exposes the entire area of the image simultaneously. This is in contrast with the term "rolling shutter" that will be used, throughout the present disclosure for another type of shutter (used in image sensors) that expose the image sequentially, from one side of the image to another, typically line by line.

DESCRIPTION

Figure 4A:
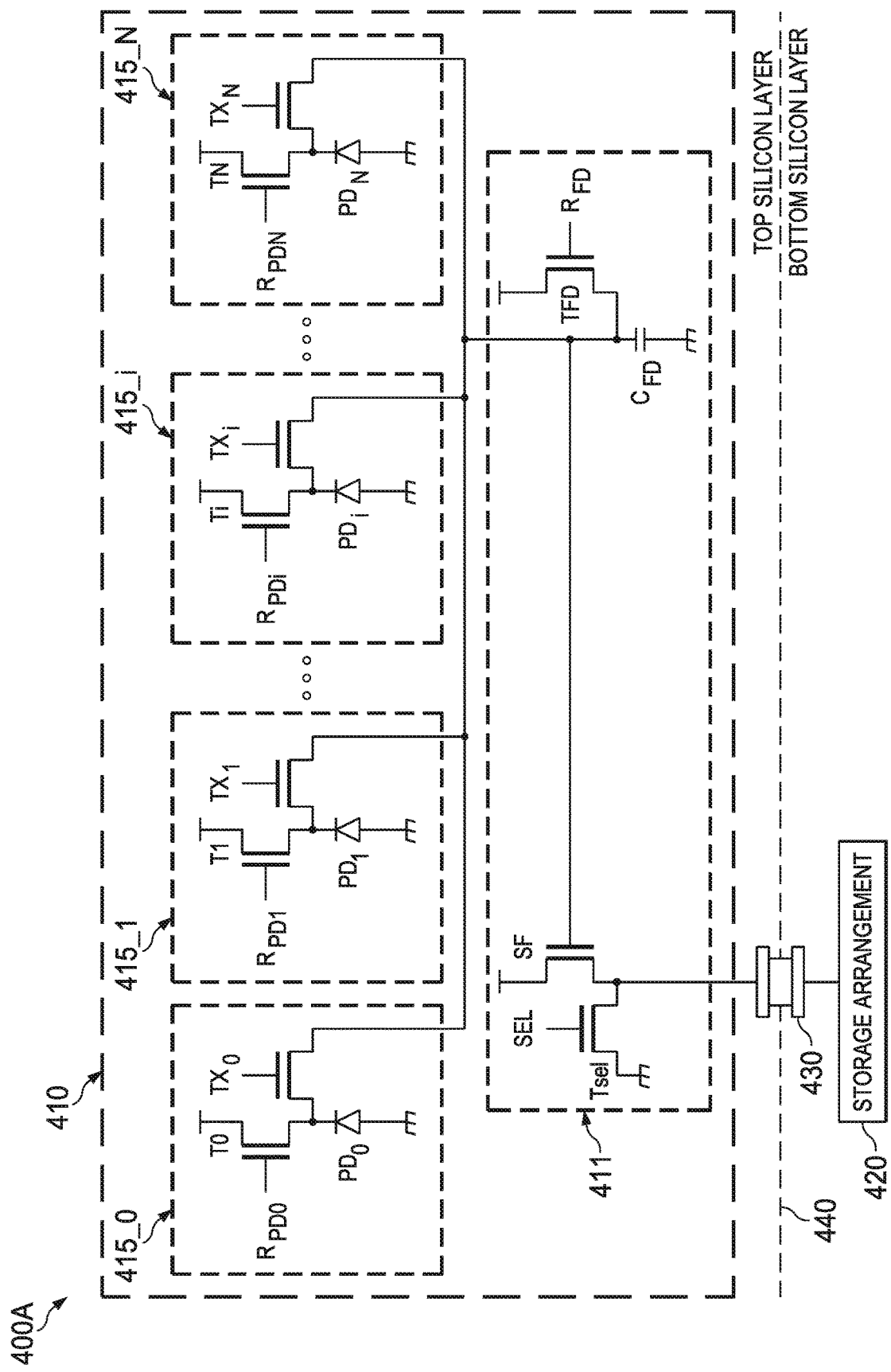
FIG. 4A show an electronic circuit according to an embodiment of the present disclosure.

FIG. 4A shows an electronic circuit (400A) according to an embodiment of the present disclosure. As mentioned previously, the electronic circuit (400A) adopts the concepts disclosed in the above-incorporated application wherein image pixels are divided into groups of N×M pixels. As will be described more in detail later, image sensors comprising a plurality of the electronic circuit (400A) may be designed to incorporate a global shutter based on pixel type and staggered readout based on pixel type of two samples per pixel.

Figure 1:
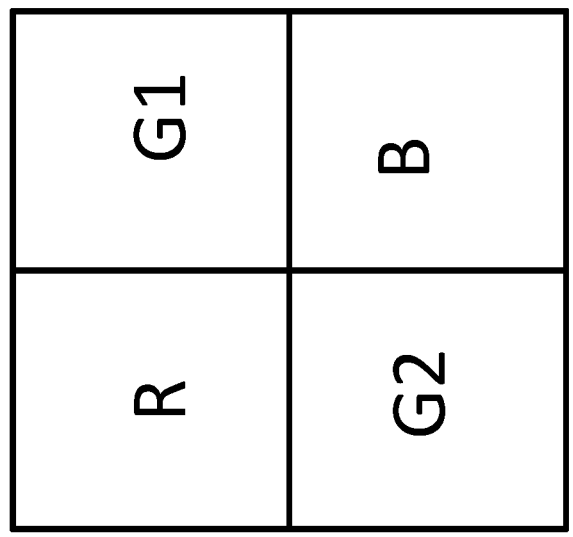
FIG. 1 shows a Bayer mosaic structure cell.
Figure 3A:
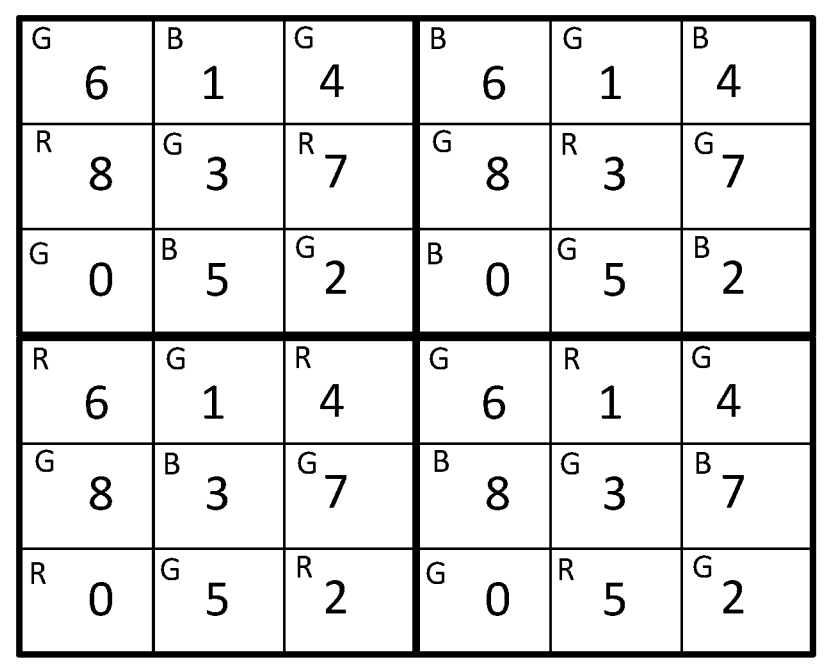
Figure 3B:
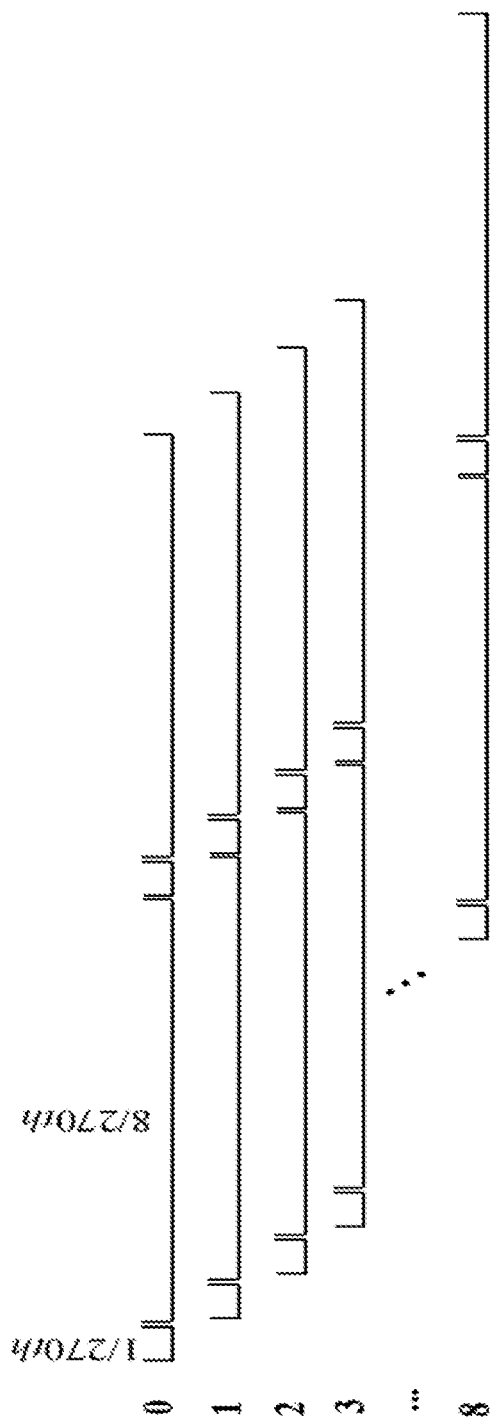
FIG. 3B shows prior art staggered short and long exposure of pixel types of the Bayer mosaic of FIG. 3A.
Figure 5A:
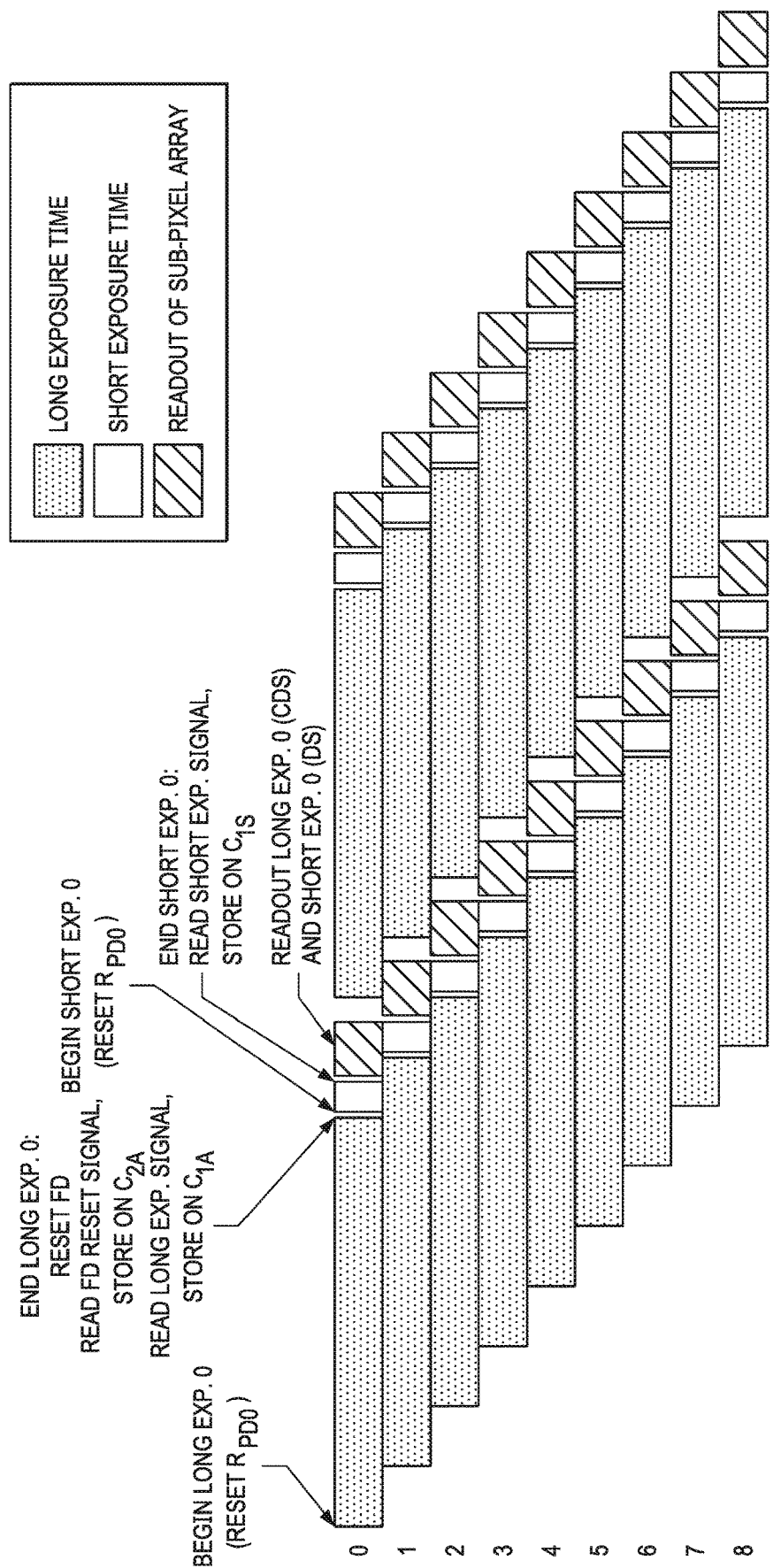
FIGS. 5A-5B shows global timing and readout sequence of an image sensor in accordance with teachings of the present disclosure.
Figure 5B:
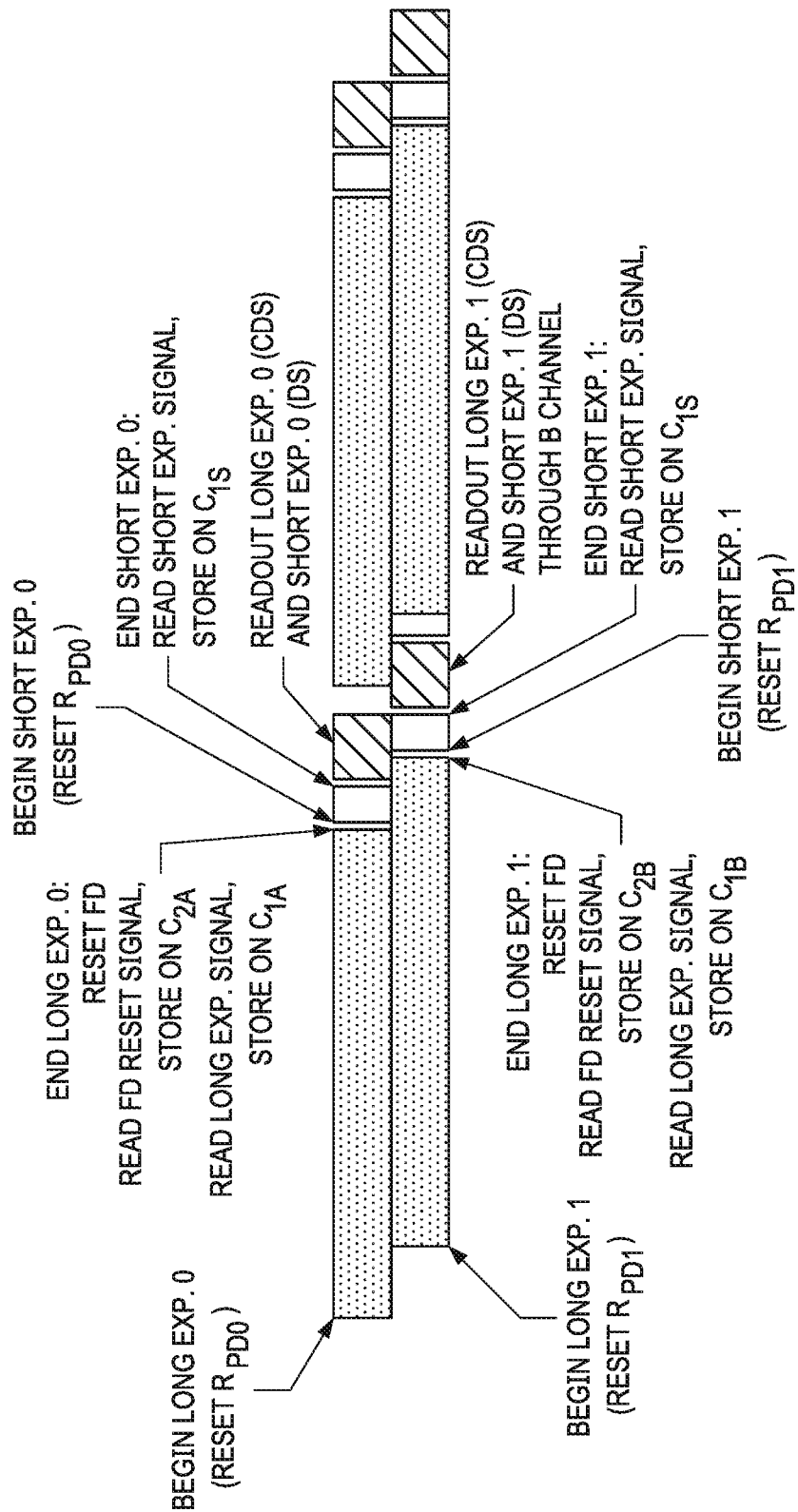

With reference to FIG. 3A, by way of example, and not of limitation, Bayer mosaic pixels as shown in FIG. 1, are considered wherein such pixels are separated into different groups of 3×3 pixels, wherein pixels within such groups are being labeled by pixel type 0-8, inclusive. In other words, pixel types are represented by a sequence of nine (number of pixels within each group) consecutive integer numbers (zero to eight). During operation, each pixel belonging to each type of pixels, may undergo long and short exposures according to embodiments of the present disclosure. FIGS. 5A-5B show exemplary timing diagrams (500A, 500B) associated with the electronic circuit (400A) of FIG. 4A while in operation. The timing diagrams (500A, 500B) represent the timings related to short and long exposures as well as readout of each of pixel types 0-8. Blocks with dashed vertical lines represent long exposure time, blocks with no pattern represent short exposure time, and blocks with striped pattern represent the readout time. As shown in FIG. 5A, and continuing with the same example as above, the exposure and readout of each of these pixel types is staggered by a set offset time equal to ⅑ (9 being equal to 3×3 which is the number of pixels in each group labeled by pixel type 0-8) of a frame relative to the previous type. For example, the start and end of short and/or long exposures plus readout for pixel type 2 will occur ⅑ of a frame after pixel type 1. Readout of the sensor pixels may start with pixel type 0, followed by pixel type 1, etc. Each pixel type will contain ⅑ of the total sensor pixels, and during readout, each pixel will have a short and long exposure value produced at the output. Since there are twice as many samples read from the sensor, the readout data rate will be twice that of the frame rate times the number of pixels. For example, for a sensor operated at a frame rate of 30 frames per second, the output data rate would be 30*Npix*2=60*Npix, where Npix is equal to the number of pixels on the sensor. It is important to note that global shuttering may be used for all pixels within a pixel type, in contrast to the common use of rolling shutters in consumer sensors. This means pixels within the same pixel type may be exposed at the same time, without triggering exposure start or end for pixels from other pixel types. With reference to FIGS. 5A-5B, the person skilled in the art will understand that without departing from the spirit and scope of the disclosure, the long and the short exposures can be executed in any arbitrary order (e.g. long exposure first then short exposure, or short exposure first followed by long exposure).

With further reference to the above-mentioned example, the person skilled in the art will understand that the Bayer filter is used as an example to describe the invention.

Without departing from the spirit and scope of the invention, other embodiments may be designed wherein color filters other than the Bayer filter, such as CYYM (cyan, yellow, yellow, magenta), CYGM (cyan, yellow, green, magenta), RGBW (red, green, blue, white) or similar may be used, or the filter could be global in the case of a grayscale or 3-chip camera arrangement. With reference to FIGS. 5A-5B, the frame time is equal to the sum of the short and the long exposure plus the readout time, plus any blanking time required to achieve the desired frame rate. In accordance to embodiments of the present disclosure the frame times for all pixel types are the same. According to further embodiments of the present disclosure, the set offset time between consecutive pixel types may be equal to or less than the overall duration of each frame (frame time) divided by the number of pixels in each group (which is 9 for the above-mentioned example). Embodiments in accordance with the present disclosure may also be envisaged wherein the offset time may be larger than the frame time divided by the number of pixels in each group, in which case more storage elements may be used to store signal information while staggering exposure and readout of consecutive pixel types. According to further embodiments of the present disclosure, image pixels may be divided into groups of N×M pixels wherein N and M are integers larger than one.

With reference to FIG. 4A, the electronic circuit (400A) comprises a pixel site arrangement (410) and a storage arrangement (420). The pixel site arrangement (410) comprises a plurality of pixel sites (415_0, . . . , 415_N), each pixel site (415_$i$, i=0, . . . , N) comprising a photodiode (PD), a reset transistor Ti configured to receive a corresponding photodiode reset signal from a reset line ($R_{PDi}$) and a transfer transistor ($TX_i$). Because of the temporal staggering of the pixel types within a group, this design may utilize a shared floating diffusion architecture. In other words, transfer transistors ($TX_1$, . . . , $TX_N$) of the plurality of pixels sites share a floating diffusion element (411). As such, and continuing with the same examples of 3×3 pixel groups, and in accordance with embodiments of the present disclosure, the floating diffusion element (411) may not be addressed by more than one pixel at a time (within the group of 3×3 pixels). The floating diffusion element (411) has an associated floating diffusion capacitance ($C_{FD}$) that is connected to floating diffusion transistor ($T_{SF}$). The floating diffusion transistor has a reset line ($R_{FD}$) and a source-follower transistor ($T_{SF}$) providing signal isolation and replication for connected circuit elements. The storage arrangement (420) may be used to store pixel signals generated by the pixel site arrangement (410) during operation.

Figure 4B:
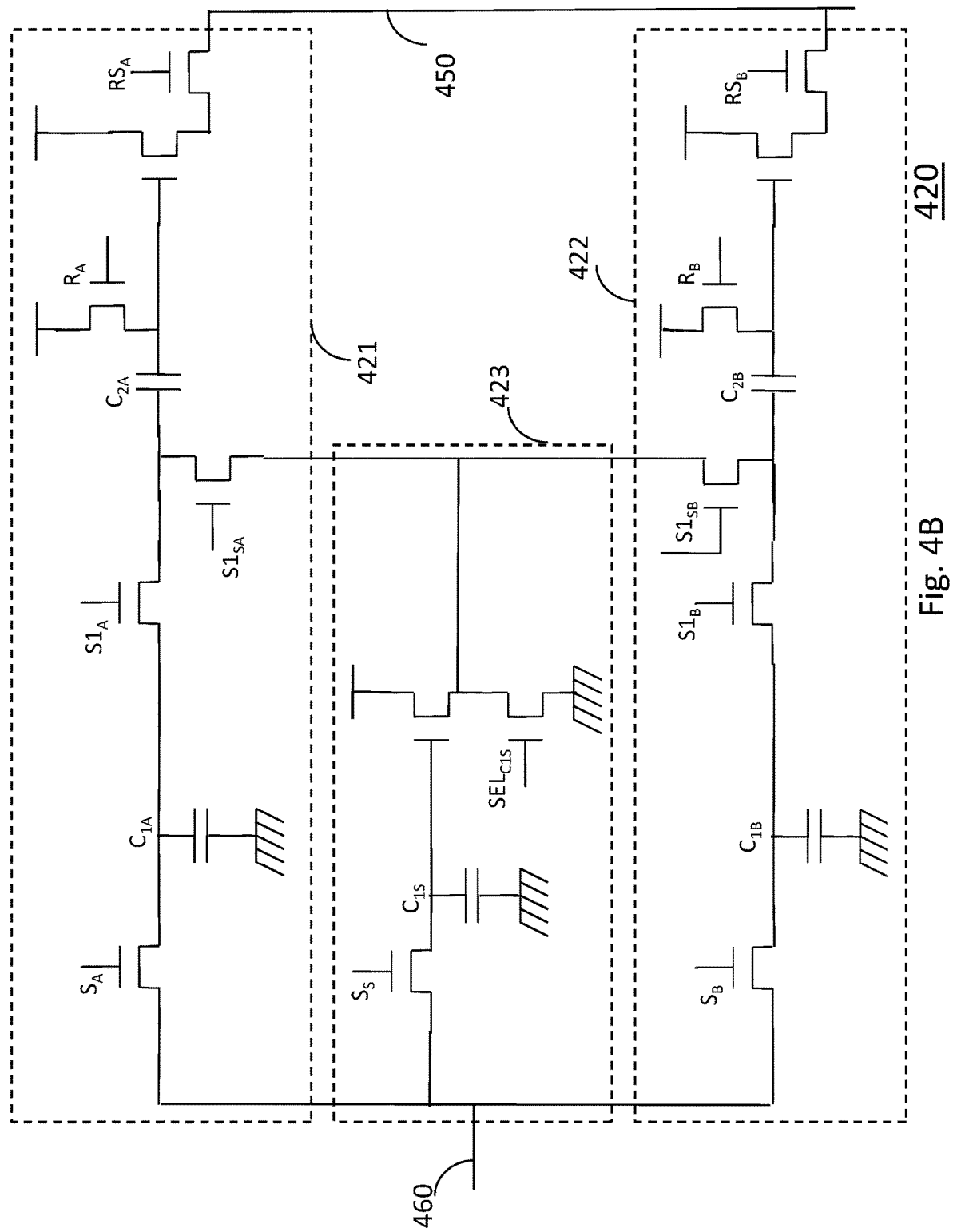
FIG. 4B shows a storage arrangement according to another embodiment of the present disclosure.

FIG. 4B shows an exemplary implementation of the storage arrangement (420) of FIG. 4A in accordance with an embodiment of the present disclosure. The storage arrangement (420) shown in FIG. 4B may implement a correlated double sampling (CDS) for a first subcircuit (421) and a second sub-circuit (422). This allows for pixel signal storage (two samples) from the pixel sites, during simultaneous readout of other pixel signals. A third sub-circuit (423) is designed for storage of short exposure signals as described in detail in the following paragraphs. As also shown in FIG. 4B, constituents of the first, second and third sub-circuits (421, 422, 423) are labeled with indices A, B, and S respectively. The storage arrangement (420) further comprises an input (460) which may be used to connect the storage arrangement (420) to the pixel site arrangement (410).

Figure 6:
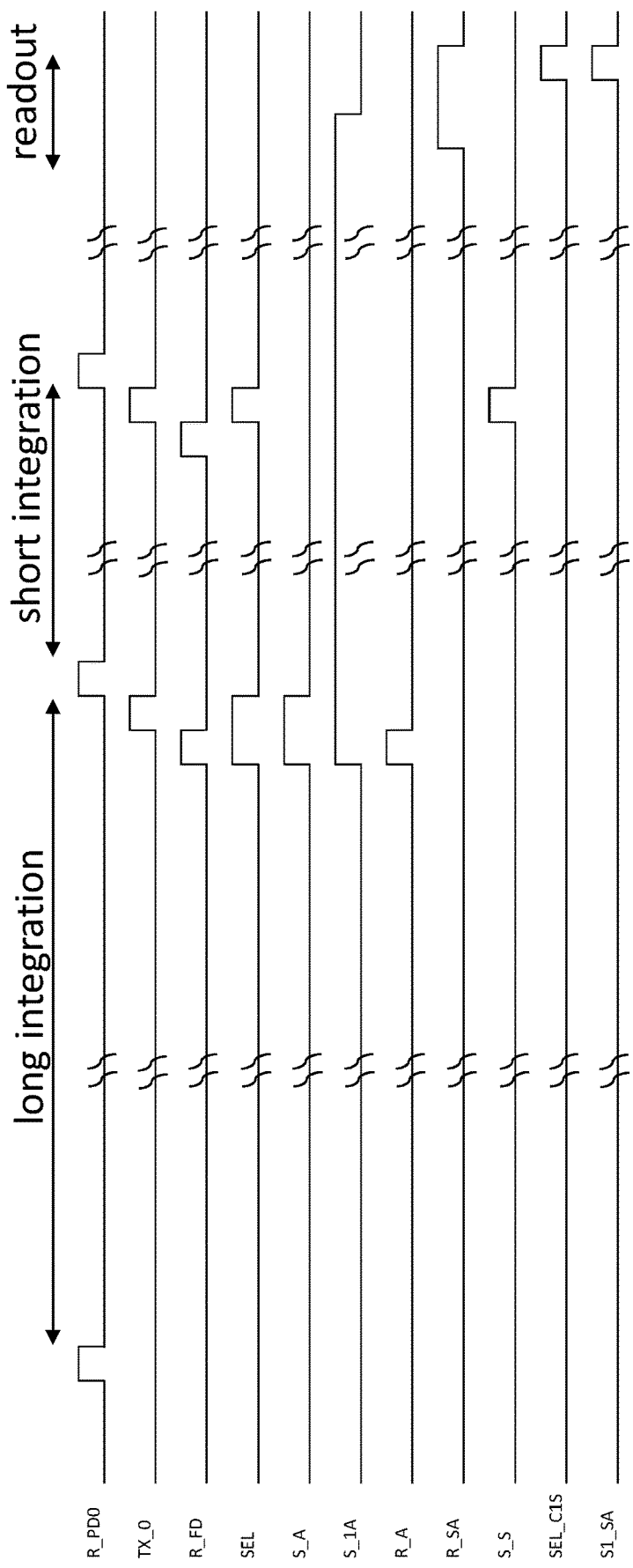
FIG. 6 shows timing diagrams of various signals related to the storage arrangement shown in FIG. 4B.

Reference is made to a combination of FIGS. 4A-6 to illustrate the time duration of long and short exposures and readout sequence for each pixel and to describe more in detail the functionalities of various elements of the electronic circuit (400A) of FIG. 4A during operation. For pixels of type 0, the long exposure is initiated by forcing a short reset signal to reset line ($R_{PD0}$). This is global to all type 0 pixels on the image sensor. In other words, reset transistors Ti (i=1, 2, . . . , N) are activated (thus resetting corresponding photodiodes) globally across each pixel type (i.e. all pixels of the same type). Just before the long exposure 0 is completed, the common capacitor ($C_{FD}$) is reset, thus generating a first pixel signal (first sample of the two samples per pixel site during long exposure) which may be used to initialize the CDS for the first sub-circuit (421). In other words, and as can be seen in FIG. 6, reset line ($R_{FD}$) is activated then deactivated; and signal lines (SEL, $S_A$, $S1_A$, $R_A$) are all activated (see FIG. 6). After this, a second pixel signal (second sample of the two samples per pixel site during long exposure) generated from the long exposure is transferred to floating diffusion element (FD) and subsequently to ($C_{1A}$). In order to do this, and as can be seen in FIG. 6, reset lines ($R_{FD}$, $R_A$) are deactivated; and signal lines ($TX_0$, SEL, $S_A$, $S1_A$) are all activated then deactivated.

It is known in the art that a large portion of the noise generated in a CMOS sensor is from the reset of the floating diffusion element and this is due to the relatively large capacitance of this element. The person skilled in the art will appreciate that by resetting the floating diffusion capacitor ($C_{FD}$), the first pixel sample which is a voltage equivalent to the reset voltage plus noise is generated and as a result, capacitor C2A will carry a voltage equivalent to the noise. The person skilled in the art will also appreciate that as a result of the transfer of the second pixel signal from the long exposure, a voltage equivalent to the signal plus floating diffusion noise is effectively appeared across the capacitor ($C_{1A}$). With reference to FIG. 4B, and during the readout, the signal read is essentially the difference between the voltages across capacitances ($C_{1A}$) and ($C_{2A}$), meaning that the voltage due to the floating diffusion reset noise will be subtracted out by virtue of correlated double sampling.

With further reference to FIGS. 4A-6, after the long exposure is transferred from floating diffusion element, a short reset signal is sent to ($R_{PD0}$) in order to start the short exposure. At the end of the short exposure, the pixel signal from photo diode ($PD_0$) is transferred to capacitor $C_{1S}$ by activating signal lines ($TX_0$, SEL, $S_S$) and deactivating both signal lines ($S_A$, $S1_A$). Once the pixel signal corresponding to short exposure is transferred to the third sub-circuit (423) of the storage, the type 0 pixels short and long samples are held (and isolated) until readout of that type. Meanwhile, for type 1 pixels (see FIG. 5B), the long exposure completes and can be transferred to the second sub-circuit of the storage arrangement (420) in a similar fashion as that described for type 0 pixels.

With continued reference to FIGS. 4A-6, the readout is performed after activating the signal ($RS_A$), thereby connecting the sub-circuit (421) to a column line (450) to transfer the long exposure pixel signal. Moreover, by activating and then deactivating signals ($SEL_{C1S}$, $S1_{SA}$) short exposure pixel signal will be readout and transferred to the column line (450). After readout completes for type 0 pixels, the short exposure for group 1 is ended and that voltage can be transferred to Cis. This process continues for type 2 pixels, and then for the subsequent pixel types. The person skilled in art will understand that without departing from the spirit and scope of the invention, embodiments may also be envisaged wherein correlated double sampling may be implemented also for the sub-circuit (423) in a similar fashion as what described above with regards to the sub-circuit (421).

Figure 2A:
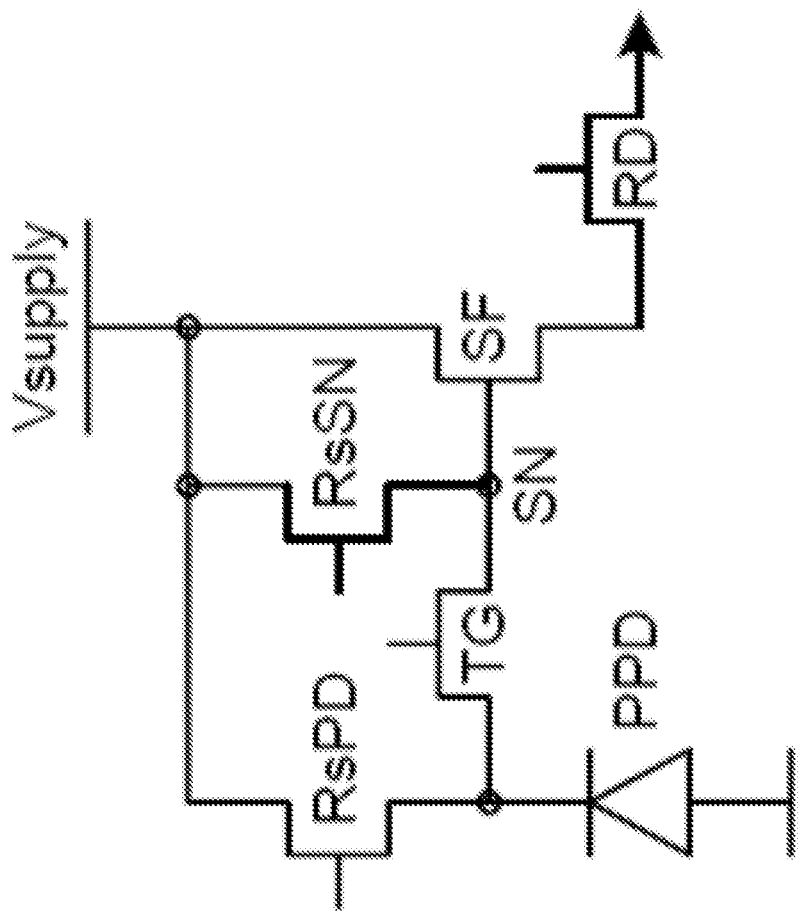
FIG. 2A shows a prior art 5 transistor (5T) pixel structure.
Figure 2B:
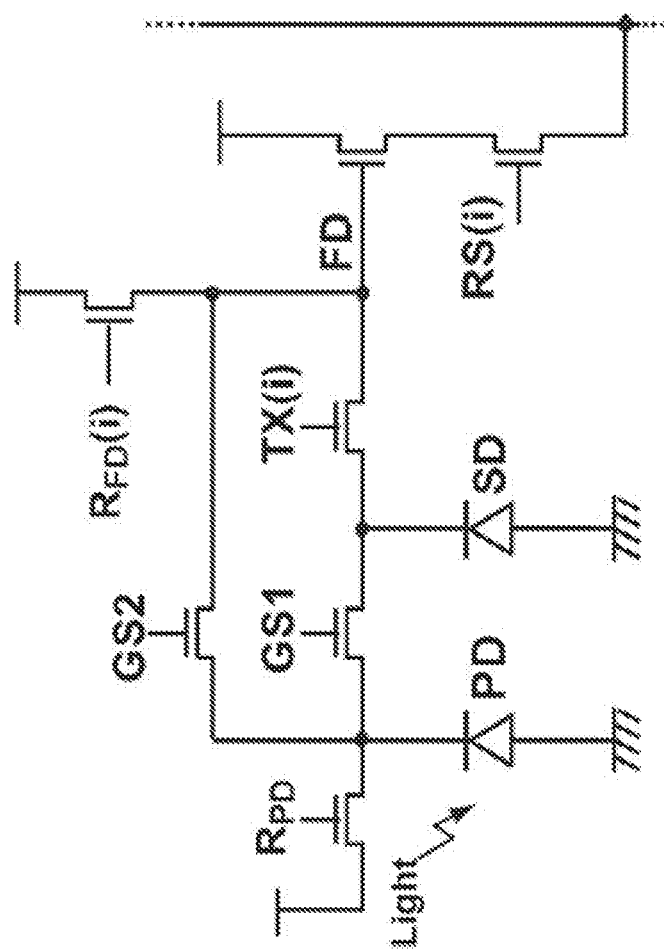
FIG. 2B shows a prior art 7 transistor (7T) pixel structure.
Figure 2C:
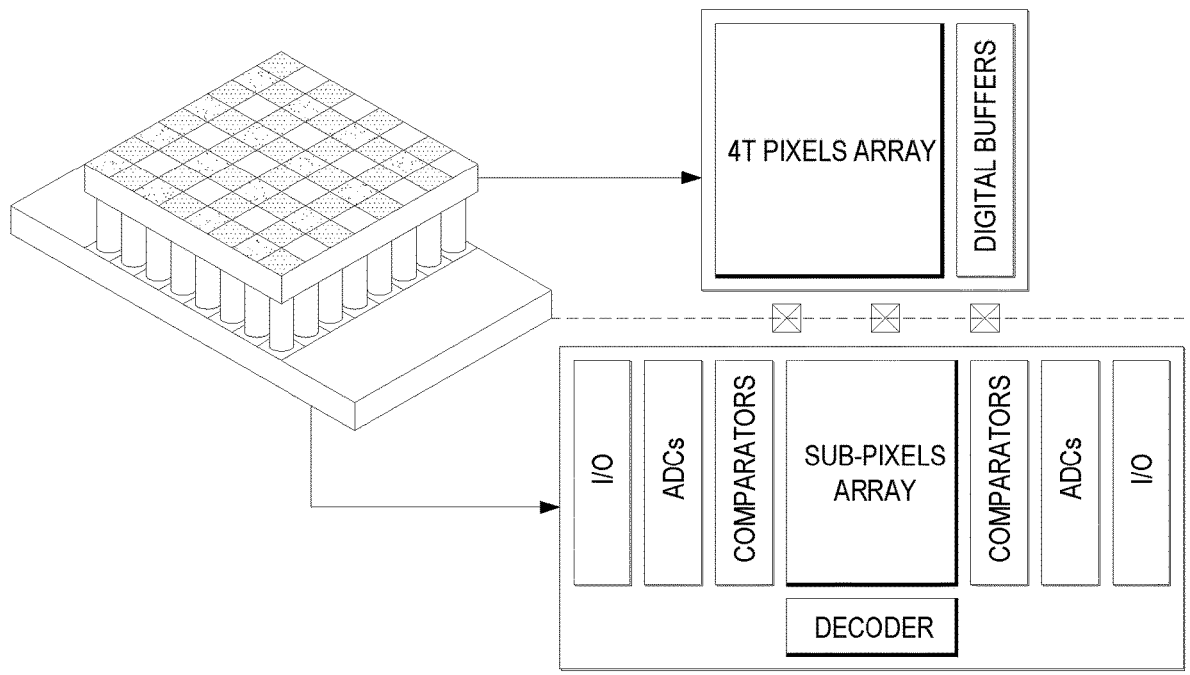
FIG. 2C shows a prior art stacked CMOS approach for intra-frame multi shuttering.
Figure 2C:
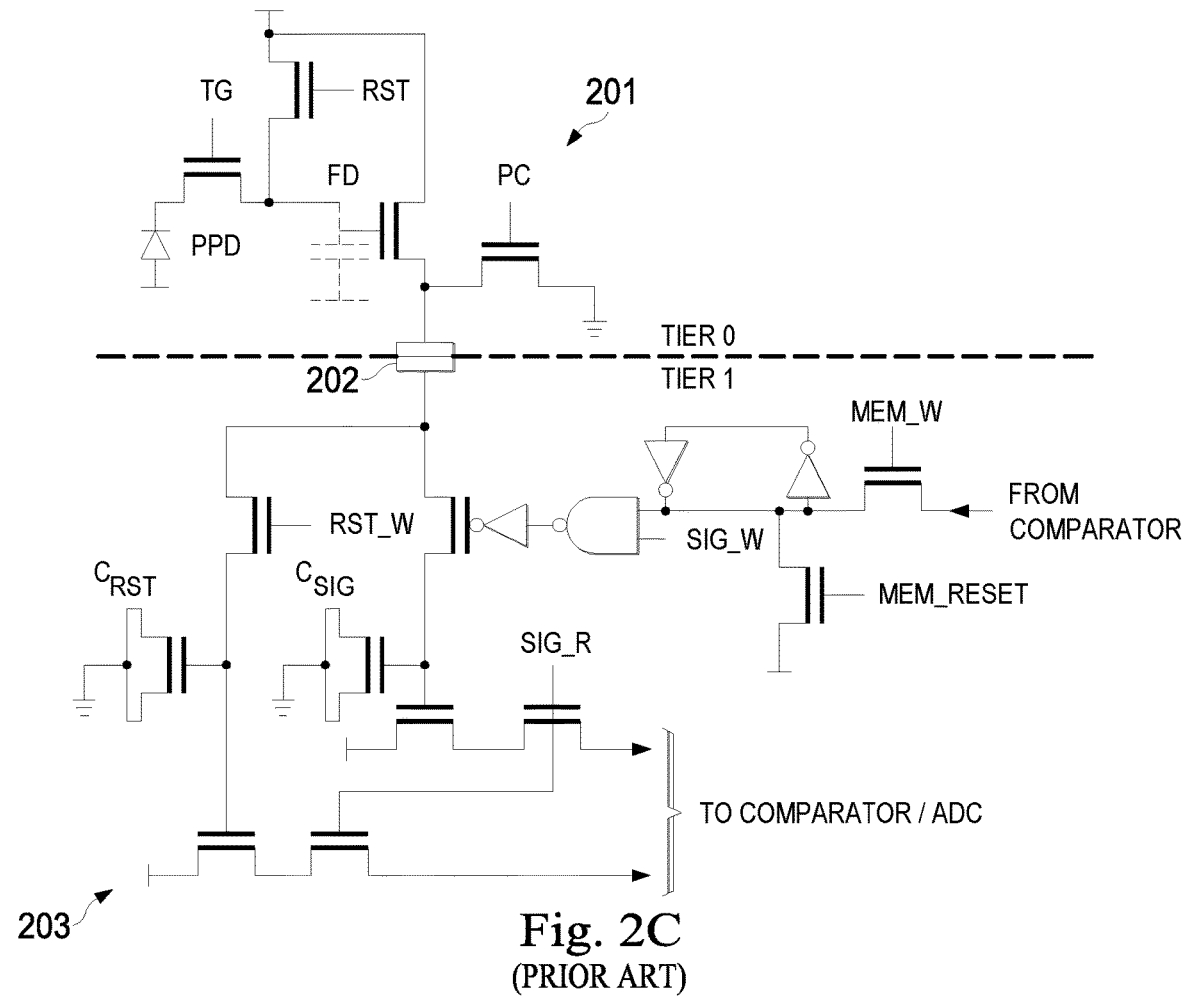

With continued reference to FIG. 4A, and according to further embodiments of the present disclosure, the electronic circuit (400A) may be designed by adopting stacked CMOS sensor technology, as described previously with regards to FIG. 2C, to store pixel signals before readout. In such embodiments the pixel site arrangement (410) and the storage arrangement (420) may be implemented in separate silicon layers, e.g. a top silicon layer and a bottom silicon layer as noted in FIG. 4A. In other words, the pixel site arrangement (410) and the storage arrangement (420) may be implemented on separate chips of dies. Furthermore, the pixel site arrangement (410) and the storage arrangement (420) may be connected through a micro-contact (430) which may, for example, represent a micro-bump contact. The person skilled in art will appreciate that by virtue of implementing the shared floating diffusion region (411), an improved photodiode fill factor may be achieved. In order to further clarify this point, and continuing with the previously described example of pixel groups of 3×3 pixels, the pixel site arrangement (410) would contain 21 transistors (2×9+3=21) and therefore, each group of 3×3 pixels would effectively have 21/9=2.33 transistors per pixel site, which allows smaller pixels and a larger photodiode fill factor.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random-access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general-purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

ENUMERATED EXAMPLE EMBODIMENTS

Enumerated example embodiments ("EEEs") of the present invention have been described above in relation to methods and devices for temporal dithered sampling. Thus, an embodiment of the present invention may relate to one or more of the examples, enumerated below:

(EEE1.) An image sensor comprising a plurality of pixel sites divided into N groups, N being an integer larger than one, wherein:
    one or more pixel sites of a group of the N groups are configured to undergo an exposure sequence comprising a first exposure of a first capture duration followed by a second exposure of a second capture duration, thereby generating a first pixel signal corresponding to the first exposure and a second pixel signal corresponding to the second exposure;
    the image sensor is configured such that the first pixel signal and the second pixel signal are read out subsequent to the second exposure;
    start times of the exposure sequences of consecutive groups of the N groups are staggered by a set offset time;
    the groups of the N groups have equal frame times, wherein the frame time of the group of the N groups is defined as a sum of the first capture duration, the second capture duration, and the readout time.

(EEE2.) The image sensor as recited in enumerated example embodiment 1, wherein the groups of the N groups are formed by dividing a color filter mosaic into groups of M×M pixels wherein $N=M^2$ and wherein M is an integer larger than one.

(EEE3.) The image sensor as recited in enumerated example embodiment 1 or 2, wherein the color filter mosaic is one of a) Bayer filter, b) CYYM filter, c) CYGM filter, or d) RGBW filter.

(EEE4.) The image sensor as recited in any preceding enumerated example embodiment, wherein the first capture duration and the second capture durations are different.

(EEE5.) The image sensor as recited in any preceding enumerated example embodiment, wherein the set offset time is equal to or less than the frame time of each group of the N groups divided by N.

(EEE6.) The image sensor as recited in enumerated example embodiment 5, wherein:
    the first capture durations of all groups of the N groups are equal;
    the second capture durations of all groups of the N groups are equal; and
    the readout times of all groups of the N groups are equal.

(EEE7.) An electronic circuit comprising a pixel site arrangement and a storage arrangement, wherein:
    the pixel site arrangement comprises N pixel sites, N being an integer larger than one, and a floating diffusion circuit;
    a pixel site of the N pixel sites comprises a photodiode, a pixel site reset transistor to reset the photodiode and a pixel site transfer transistor through which pixel signals are transferred to the floating diffusion circuit when the pixel site transfer transistor is activated;

the floating diffusion element comprises:
  i) a floating diffusion capacitor to store charges from pixel signals generated due to exposures;
  ii) a floating diffusion reset transistor connected to the floating diffusion capacitor and used to reset the floating diffusion capacitor; and
  iii) a floating diffusion transfer transistor arranged in a source-follower configuration and connecting the floating diffusion capacitor to the storage arrangement; and the floating diffusion element is shared among the N pixel sites.

(EEE8.) The electronic circuit as recited in enumerated example embodiment 7, wherein the pixel site transfer transistors of the N pixel sites are activated one at a time to connect one pixel site of the N pixel sites with the floating diffusion element at a time.

(EEE9.) The electronic circuit as recited in enumerated example embodiment 7 or 8, wherein the pixel site arrangement and the storage arrangement are implemented on separate dies or chips.

(EEE10.) The electronic circuit as recited in enumerated example embodiment 9, wherein the separate dies or chips are connected to each other through micro-bumps.

(EEE11.) The electronic circuit as recited in enumerated example embodiment 8, 9 or 10, wherein:
  a pixel site of the N pixel site, wherein N is configured to undergo an exposure sequence comprising a first exposure of a first capture duration followed by a second exposure of a second capture duration, thereby generating a first pixel signal corresponding to the first exposure followed by a second pixel signal corresponding to the second exposure; and
  the electronic circuit is configured such that the first pixel signal and the second pixel signal are read out subsequent to the second exposure;
  start times of the exposure sequences of consecutive pixel sites of the N pixel sites are staggered by a set offset time; and
  the pixel sites of the N pixel sites have equal frame times, wherein the overall frame time of the pixel site of the N pixel sites is defined as a sum of the first capture duration, the second capture duration, and the readout time.

(EEE12.) The electronic circuit as recited in any one of enumerated example embodiments 7 to 11, wherein:
  the first capture duration of all pixel sites of the N pixel sites are equal;
  the second capture duration of all pixel sites of the N pixel sites are equal; and
  the readout time of all pixel sites of the N pixel sites are equal.

(EEE13.) The electronic circuit as recited in enumerated example embodiment 10, wherein the storage circuit comprises a first, a second and a third sub-circuit connected with one another, and wherein:
  the first sub-circuit is configured to store the first pixel signal of a first pixel site of the N pixel sites;
  the third sub-circuit is configured to store the second pixel signal of the first pixel site of the N pixel sites and subsequently reconfigured to store the second pixel signal of a second pixel site of the N pixel sites;
  the second sub-circuit is configured to store the first pixel signal of the second pixel site;

the first and the second pixel sites of the N pixel sites are consecutive pixel sites.

(EEE14.) The electronic circuit as recited in enumerated example embodiment 11, wherein the first pixel signal comprises two samples per pixel site.

(EEE15.) The electronic circuit as recited in enumerated example embodiment 12, wherein the two samples comprises a first sample and a second sample and wherein:
  the first sample corresponds to charges across the floating diffusion capacitor after the floating diffusion capacitor is reset by activating the floating diffusion reset transistor; and
  the second sample corresponds to charges generated due to the first exposure of a corresponding pixel site of the N pixel sites.

(EEE16.) The electronic circuit as recited in any one of enumerated example embodiments 13 to 15, wherein the second pixel signal corresponds to charges generated due to the second exposure of the corresponding pixel site of the N pixel sites.

(EEE17.) The electronic circuit as recited in enumerated example embodiment 14, wherein:
  the first sub-circuit comprises a first capacitor, a second capacitor, and a plurality of first sub-circuit transistors connected with the first capacitor and/or the second capacitor;
  the second sub-circuit comprises a third capacitor, a fourth capacitor, and a plurality of second sub-circuit transistors connected with the third capacitor and/or the fourth capacitor;
  the third sub-circuit comprises a fifth capacitor, and a plurality of third sub-circuit transistors connected with the fifth capacitor;
  the charges corresponding to the first sample of the first pixel site are stored and held across the first capacitor until a readout of the first sub-circuit;
  the charges corresponding to the second sample of the first pixel site are stored and held across the second capacitor until the readout of the first sub-circuit;
  the charges corresponding to the first sample of the second pixel site are stored and held across the third capacitor until a readout of the second sub-circuit;
  the charges corresponding to the second sample of the second pixel site are stored and held across the fourth capacitor until the readout of the second sub-circuit;
  the charges corresponding to the second pixel signal of the first pixel site are stored and held across the fifth capacitor until the readout of the first sub-circuit;
  the charges corresponding to the second pixel signal of the second pixel site are stored across the fifth capacitor after the readout of the first sub-circuit and held across the fifth capacitor until the readout of the second sub-circuit,
  a sub-circuit of the first, the second and third sub-circuit comprises a first set of transistors and a second set of transistors, wherein:
    the first set of transistors are activated and the second transistor set is inactivated during a charge storage in the sub-circuit; and
    the first set of transistors are inactivated and the second set of transistors are activated during a readout of the sub-circuit.

(EEE18.) An image sensor comprising a plurality of the electronic circuit as recited in any one of enumerated example embodiments 11 to 17, wherein:
  pixel sites are divided into N pixel groups, N being an integer larger than one, and wherein each pixel group of the N pixel groups comprises corresponding pixel sites of the plurality of the electronics circuits; and the pixel site reset transistor is activated globally across each pixel group of the N pixel groups.

(EEE19.) A method of imaging comprising:
providing a plurality of pixel sites;
dividing the plurality of the pixel sites into N groups, N being an integer larger than one;
exposing pixel sites of a group of the N groups to a first exposure of a first capture duration, thereby generating a first pixel signal;
exposing the pixel sites of the group of the N groups to a second exposure of a second capture duration, thereby generating a second pixel signal;
reading out the first pixel signal and the second pixel signal; and
staggering the first exposure, the second exposure and the readout of consecutive pixels sites by a set offset time.

(EEE20.) The method as recited in enumerated example embodiment 19, wherein the groups of the N groups are formed by dividing a color filter mosaic into groups of M×M pixels wherein $N=M^2$ and wherein M is an integer larger than one.

(EEE21.) The imaging method as recited in enumerated example embodiment 19 or 20, wherein the color filter mosaic is one of a) Bayer filter, b) CYYM filter, c) CYGM filter, or d) RGBW filter.

(EEE22.) The imaging method as recited in enumerated example embodiment 19, 20 or 21, wherein the first capture duration and the second capture durations are different.

(EEE23.) The imaging method as recited in enumerated example embodiment 20, 21 or 22, wherein the set offset time is equal to or less than the frame time of each group of the N groups divided by N.

(EEE24.) The imaging method as recited in enumerated example embodiment 21, 22 or 23, wherein:
the first capture durations of all groups of the N groups are equal;
the second capture durations of all groups of the N groups are equal; and
the readout times of all groups of the N groups are equal.

The invention claimed is:

1. An image sensor comprising a plurality of electronic circuits,
each electronic circuit comprising a pixel site arrangement and a storage arrangement, the pixel site arrangement comprising a group of N×M pixel sites, N and M being integers larger than one, and a floating diffusion circuit, wherein:
the pixel sites of the N×M pixel sites are of consecutive pixel types;
each pixel site of the N×M pixel sites is configured to undergo an exposure sequence comprising a first exposure of a first capture duration followed by a second exposure of a second capture duration, thereby generating a first pixel signal corresponding to the first exposure and a second pixel signal corresponding to the second exposure;
the electronic circuit is configured for storing the first signal in a sub-circuit of the storage arrangement subsequent to the first exposure, and for storing the second signal in a sub-circuit of the storage arrangement subsequent to the second exposure;
the electronic circuit is configured for readout of a sub-circuit of the storage arrangement storing the first pixel signal and a sub-circuit of the storage arrangement storing the second pixel signal subsequent to storing the second pixel signal in a sub-circuit of the storage arrangement;
start times of the exposure sequences of pixel sites of consecutive pixel types are staggered by a set offset time equal to or less than a frame time of each pixel site divided by N×M; the N×M pixel sites have equal frame times, wherein the frame time of each pixel site is defined as a sum of the first capture duration, the second capture duration, the readout time, and a blanking time;
each pixel site of the N×M pixel sites comprises a photodiode, a pixel site reset transistor to reset the photodiode, and a pixel site transfer transistor through which pixel signals are transferred to the floating diffusion circuit when the pixel site transfer transistor is activated;
the floating diffusion circuit comprises:
i) a floating diffusion element to store charges from pixel signals transferred to the floating diffusion circuit from the N×M pixel sites;
ii) a floating diffusion reset transistor connected to the floating diffusion element and used to reset the floating diffusion element; and
iii) a floating diffusion transfer transistor connecting the floating diffusion element to the storage arrangement;
wherein the pixel site transfer transistors of the N×M pixel sites are configured to be activated one at a time to connect one pixel site of the N×M pixel sites with the floating diffusion element at a time;
wherein the image sensor is configured for triggering the exposure sequences all at the same time for pixel sites of the same pixel type within the groups of N×M pixel sites of the plurality of electronic circuits.

2. The image sensor of claim 1, wherein the groups of N×M pixel sites are formed by dividing a color filter mosaic into groups of N×M pixels.

3. The image sensor of claim 2, wherein the color filter mosaic is one of a) Bayer filter, b) CYYM filter, c) CYGM filter, or d) RGBW filter.

4. The image sensor of claim 1, wherein the first capture duration and the second capture durations are different.

5. The image sensor of claim 1, wherein:
the first capture durations of all the pixel sites are equal;
the second capture durations of all the pixel sites are equal; and
the readout times of all the pixel sites are equal.

6. The image sensor of claim 1, wherein the pixel site arrangement and the storage arrangement are implemented on separate dies or chips.

7. The image sensor of claim 6, wherein the separate dies or chips are connected to each other through micro-bumps.

8. The image sensor of claim 1, wherein the storage arrangement comprises a first, a second and a third sub-circuit, and wherein:
the first sub-circuit is configured to store the first pixel signal of a first pixel site of the N×M pixel sites;
the third sub-circuit is configured to store the second pixel signal of the first pixel site of the N×M pixel sites and subsequently reconfigured to store the second pixel signal of a second pixel site of the N×M pixel sites;
the second sub-circuit is configured to store the first pixel signal of the second pixel site of the N×M pixel sites;
the first and the second pixel sites of the N×M pixel sites are of consecutive pixel types.

9. The image sensor of claim 1, wherein the first pixel signal comprises a first sample and a second sample and wherein:
the first sample corresponds to charges across the floating diffusion element after the floating diffusion element is reset by activating the floating diffusion reset transistor;
the second sample corresponds to charges generated due to the first exposure of a corresponding pixel site of the N×M pixel sites.

10. The image sensor of claim 1, wherein the second pixel signal corresponds to charges generated due to the second exposure of the corresponding pixel site of the N×M pixel sites.

11. The image sensor of claim 8, wherein the first sub-circuit comprises a first capacitor, a second capacitor, and a plurality of first sub-circuit transistors connected with the first capacitor and/or the second capacitor;
the second sub-circuit comprises a third capacitor, a fourth capacitor, and a plurality of second sub-circuit transistors connected with the third capacitor and/or the fourth capacitor; the third sub-circuit comprises a fifth capacitor, and a plurality of third sub-circuit transistors connected with the fifth capacitor;
the charges corresponding to the first sample of the first pixel site are stored and held across the first capacitor until a readout of the first sub-circuit;
the charges corresponding to the second sample of the first pixel site are stored and held across the second capacitor until the readout of the first sub-circuit;
the charges corresponding to the first sample of the second pixel site are stored and held across the third capacitor until a readout of the second sub-circuit;
the charges corresponding to the second sample of the second pixel site are stored and held across the fourth capacitor until the readout of the second sub-circuit;
the charges corresponding to the second pixel signal of the first pixel site are stored and held across the fifth capacitor until the readout of the first sub-circuit;
the charges corresponding to the second pixel signal of the second pixel site are stored across the fifth capacitor after the readout of the first sub-circuit and held across the fifth capacitor until the readout of the second sun-circuit;
a sub-circuit of the first, the second and third sub-circuit comprises a first set of transistors and a second set of transistors, wherein:
the first set of transistors are activated and the second set of transistors is inactivated during a charge storage in the sub-circuit; and
the first set of transistors are inactivated and the second set of transistors are activated during a readout of the sub-circuit.

12. The image sensor of claim 1, wherein:
the pixel site reset transistors of the plurality of electronic circuits are activated globally across pixel sites of the same pixel type.

13. A method of imaging comprising:
providing an image sensor comprising a plurality of electronic circuits, each electronic circuit comprising a pixel site arrangement comprising a group of N×M pixel sites, N and M being integers larger than one, and a storage arrangement, wherein the pixel sites of the N×M pixel sites are of consecutive pixel types, wherein each pixel site of the N×M pixel sites comprises: a photodiode, a pixel site reset transistor to reset the photodiode, and a pixel site transfer transistor through which a pixel signal is transferred to a floating diffusion circuit when the pixel site transfer transistor is activated, wherein the floating diffusion circuit comprises: i) a floating diffusion element to store a charge from a pixel signal transferred to the floating diffusion circuit from a pixel site; ii) a floating diffusion reset transistor connected to the floating diffusion element and used to reset the floating diffusion element; and iii) a floating diffusion transfer transistor connecting the floating diffusion element to the storage arrangement; and
for each electronic circuit,
exposing each pixel site of the N×M pixel sites to an exposure sequence comprising a first exposure of a first capture duration followed by a second exposure of a second capture duration, thereby generating a first pixel signal corresponding to the first exposure and a second pixel signal corresponding to the second exposure;
storing the first signal in a sub-circuit of the storage arrangement subsequent to the first exposure, and storing the second signal in a sub-circuit of the storage arrangement subsequent to the second exposure;
subsequent to storing the second pixel signal in a sub-circuit of the storage arrangement, reading out a sub-circuit of the storage arrangement storing the first pixel signal and a sub-circuit of the storage arrangement storing the second pixel signal; and
staggering the first exposure, the second exposure, the readout and a blanking time of pixel sites of consecutive pixel types by a set offset time equal to or less than a frame time of each pixel site is divide by N×M, wherein the frame time of each pixel site is defined as a sum of the first capture duration, the second capture duration, the readout time, and the blanking time;
wherein the pixel site transfer transistors of the N×M pixel sites of each electronic circuit are activated one at a time to connect one pixel site of the N×M pixel sites with the floating diffusion element at a time;
wherein the exposure sequences are triggered all at the same time for pixel sites of the same pixel type within the groups of N×M pixel sites of the plurality of electronic circuits.

14. The method of claim 13, wherein the groups of the N×M pixel sites are formed by dividing a color filter mosaic into groups of N×M pixels.

* * * * *